9601X
A. Barrett,
SPLITTING CORN HUSKS
Patented Apr. 21. 1836.
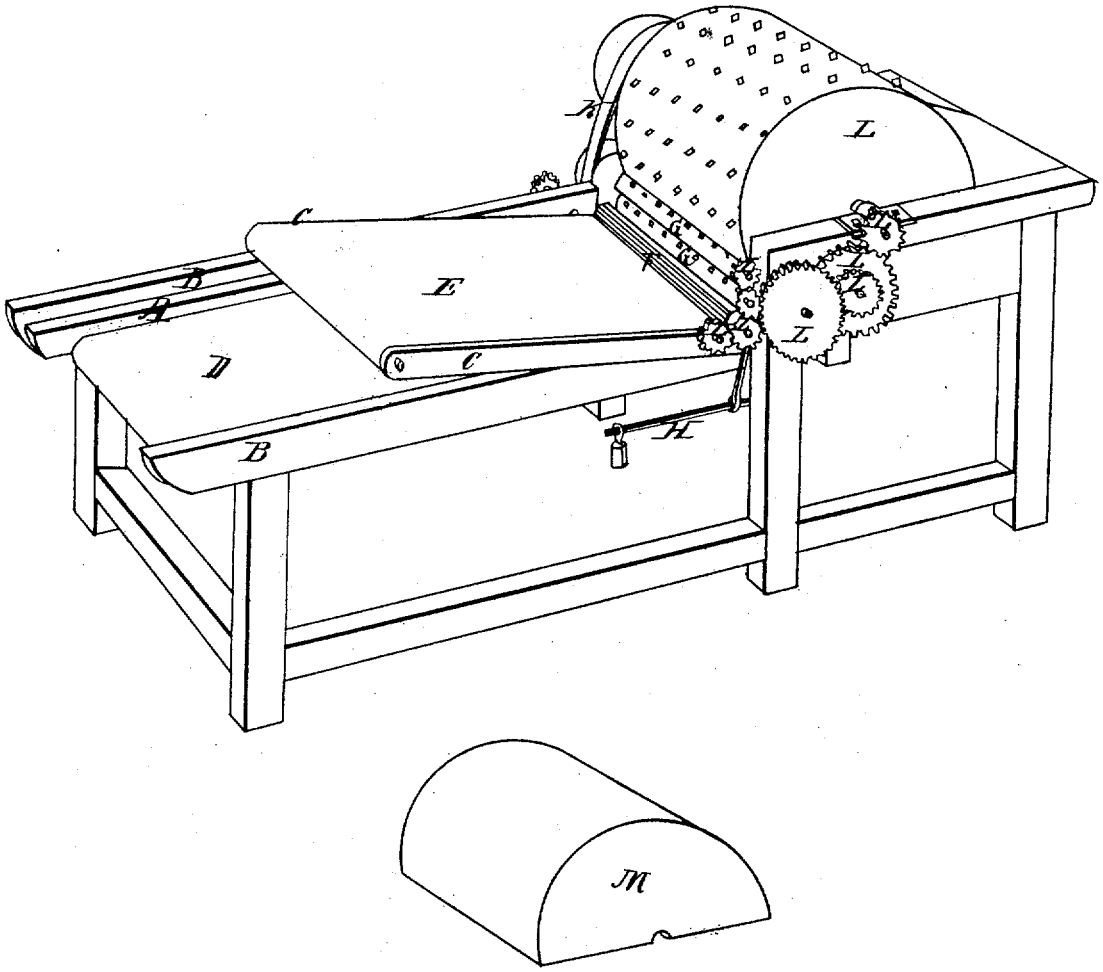
NO PRINTED SPECIFICATION AVAILABLE.

4/21/1836 9601X

April 21, 1836 17.

Asa Barrett of Baltimore Md
Letters Patent (Patented Ap. 21. 1836)

The Schedule referred to in these Letters Patent and making part of
the same containing a description in the words of the said Asa
Barrett himself of his "Improvement in splitting Corn husks for Matresses."

To all to whom these presents shall come. Be it known that I,
Asa Barrett, of the City of Baltimore, and State of Maryland,
have invented a new and useful machine for splitting the husks
of corn for Matresses, and other purposes, where stuffing is requi
red. The machine consists of a firm and substantial frame, of
timber about five and a half feet long, three feet wide, and two
and a half feet high, or the dimensions may be varied to suit con
venience. Upon this frame is attached by bolting, another frame
of smaller dimensions extending from one end to nearly the middle.
Across each end of this second frame is a roller over which a
cloth apron revolves, for the purpose of drawing the husks into the
machine. On the inner end of this second frame, is another or third
frame, about half the length of the second, attached to it by bolting
so as to form an angle with the second one, of about four or more
degrees, with a like roller at each end, over which another apron
revolves. The front roller of each frame coming nearly in contact
with the other, and being connected or geared, at one end by two
cog wheels moving the apron and compressing the husks so as to [illegible]
between the rollers. As near to the apron rollers as may be practicable
are placed two fluted iron rollers, of the same size, one immediately
over the other connected by two cog wheels at one end, that move at
the same speed as the apron roller. Over each end of the upper journal
of the fluted roller, is a [illegible] which is to press so as to admit a [illegible]
[illegible] to suit the bulk introduced, and to compress the husks
and prevent their being drawn out from between them while undergoing
the operation of splitting. Nearly as possible to these rollers, and of

4/21/1836 9601X actly over each other, are two small iron cylinders, or rollers about one
inch and a fourth in diameter, into which are inserted two or more rows
of steel points or knives, about three fourths of an inch long in a spiral
direction each row passing round one half the circumference of the
cylinder or roller. These steel points or knives are so near together that
they will split the husk into as fine fibres as may be required. These
points are set one space further to the right or left on one cylinder than
they are on the other, to prevent their coming in contact. These cylin-
ders or rollers are also connected at one end, by small cog wheels which
revolve with great speed, and are so placed when geared, that the points
will perforate the husks at the upper and lower side at the same time.
Nearly as possible to these splitting cylinders, is a large cylinder, about
two feet in diameter, in which are driven eight or more rows of flat
points or knives, in a spiral direction, of about one fourth of the cir-
cumference, set the same distance from each other as those in the split
ting cylinders, but are set one space further to the right or left, so as
to pass those of the splitting cylinders without coming in contact with them The steel points or knives of this cylinder revolve with greater speed
than those of the splitting cylinders, so as to clear the points of those cylin-
ders from husks, and prevent their being thrown over or wound round
them, under the splitting cylinders, and as near as possible to the knives
of the large cylinder crosses a bar of wood confined to the frame on
each side, on which is secured a thick plate of iron containing two
rows of steel points or knives, like those of the main or large cylin-
der, but are set twice the distance apart from each other of those
in that cylinder, and the knives in one row are exactly opposite the cen-
tre of the space between the knives of the other row, and escape those of
the large cylinder. The utility of these knives is to separate the fibres
after having been split, should any be connected at either end of the
husk. From this bar the main, or large cylinder is enclosed in a
light case, except a small space, which is left open at the back end
to discharge the husks after having passed through the machine, [illegible]

one end of the shaft of the large cylinder, is a pulley, around which a belt passes to put the machine in operation. On the same end of the shaft between this first pulley and the cylinder, is another pulley around which a belt passes, and extends around one of very small dimensions, on the shaft of the upper splitting cylinder, giving to those cylinders a number of revolutions to one of the large cylinder. At the other end of the shaft of this large cylinder is a very small cog wheel or pinion which plays into a cog wheel of five or six times its size. To this large wheel is attached a pinion, which gives motion to a cog wheel of about the size of the former, or large wheel. This last mentioned larger wheel, is connected with one of much smaller size, on the end of the shaft of the under fluted roller. This last also is connected with one of exactly the same size, on the end of the shaft of the upper feeding roller on which the apron revolves giving the feeding and the compressing, or fluted rollers, the same speed, and such speed as is required to feed the machine, and completing the movement of the whole. The husks are prepared by separating them from the stems and throwing out those of poor quality and all hard substances. They are then laid straight and evenly on the apron.

I claim the structure of the machine as above described, as well as the application for the purposes, and use mentioned in this Specification

Asa Barrell

Witnesses
William Warfield
Samuel Merryman

Patented April 21. 1836

Exd. W.C.

(1176 words) (Rec^d. & Recorded anew Aug^t. 21. 1838.)

(Drawing)